Dec. 23, 1958  J. F. MURRAY  2,865,302
PRESSURE-LOADED GEAR PUMP
Filed May 18, 1955  3 Sheets-Sheet 1

INVENTOR.
JOHN F. MURRAY
BY
ATTORNEYS

Dec. 23, 1958 J. F. MURRAY 2,865,302
PRESSURE-LOADED GEAR PUMP
Filed May 18, 1955 3 Sheets-Sheet 2

INVENTOR.
JOHN F. MURRAY
BY
ATTORNEYS

Dec. 23, 1958  J. F. MURRAY  2,865,302
PRESSURE-LOADED GEAR PUMP
Filed May 18, 1955  3 Sheets—Sheet 3

INVENTOR.
JOHN F. MURRAY
BY
ATTORNEYS

United States Patent Office 2,865,302
Patented Dec. 23, 1958

2,865,302

PRESSURE-LOADED GEAR PUMP

John F. Murray, Macedonia, Ohio, assignor to Thompson Products, Inc., Cleveland, Ohio, a corporation of Ohio Application May 18, 1955, Serial No. 509,314

2 Claims. (Cl. 103—126)

This invention relates generally to pressure-loaded gear pumps and more particularly to an improved pressure-loaded end plate construction whereby pumping efficiency is improved and pump operation occurs under more favorable circumstances of lubrication and cooling, thereby to alleviate erosion conditions.

Briefly described, the present invention relates to specific improvements in the structural and functional characteristics of a movable pressure-loaded bushing used to seal against an adjoining side face of a rotory gear fluid displacement means, the bushing providing bearing and journalling surfaces for supporting the rotary gear fluid displacement means in a pump housing. Gear pumps generally utilize a pair of intersecting bores formed by a pump housing to provide a pumping cavity. Intermeshing gears rotate within the pumping cavity to move fluid by positive displacement from an inlet on one side of the cavity to an outlet at the other side of the cavity. Pressure-loaded movable bushings are employed to seal one side of the cavity, the other side of the cavity being sealed by stationary bushings or by an appropriately constructed portion of the pump housing. The pressure-loaded bushing is usually subjected to fluid at pump generated pressure so that a continuous biasing force will urge the bushing into proper sealing relationship with the adjoining side faces of the rotary fluid displacement means.

In accordance with the present invention, the movable bushing is provided with a sealing face particularly characterized by the formation therein of a bore having bore walls to journal and provide bearing support for the rotary fluid displacement means. One bushing is provided for each intersecting bore and a pair of the movable bushings, according to the present invention, are used for the corresponding pair of intersecting bores forming the pumping cavity. Chordal sections are provided on the respective bushings to form abutment surfaces on each of the bushings. Registering recesses are formed in these abutment surfaces and a pin is located in the recesses to provide shifting of the bushings.

The sealing face of the bushing is also particularly characterized by the formation thereon of a chamfered area on the inlet side of the pump. This chamfered area forms a recess means on the inlet side of the surface and extends inwardly from the periphery of the bushing to lie adjacent the tooth spaces of the adjoining rotary gears. By virtue of such provision, an erosion condition is alleviated which exists at the inlet side of the pump in an area which extends generally tangentially with respect to the bushing periphery.

The sealing surface of the bushing is further characterized by the formation therein of an axially extending recess or trapping relief recess on the outlet side of the bushing. This recess lies adjacent the point of intermesh of the meshing gears and prevents trapping of fluid in the mesh when the pump is operating at high speed. According to the present invention, a second chamfered area is formed on the sealing surface to provide recess means extending tangentially away from the trapping relief, thereby to further improve the operation of the pump.

The present invention further contemplates the provision of a recess located inwardly of the periphery of the bushing. In one form of the invention, the recess advantageously takes the form of a counterbore or annular recess at the bearing and journalling surface of the bushing. That recess or counterbore is supplied with fluid at pump generated pressures by means of a passage which extends in a general radial direction, the passage establishing fluid communication between a pressure control chamber at the back surface of the bushing and the recess or counterbore at the radial innermost portions of the bushing. Thus, the recess or counterbore is provided with a pressurized source of fluid for cooling and lubricating purposes.

To further assist in flooding the bearing and journalling surfaces with a coolant and lubricant, additional passage means are formed in the bearing and journalling surfaces and communicate with the recess or counterbore.

An additional recess is formed in the sealing surface of the bushing and takes the form of an annular groove located outwardly of the root diameter of the gear teeth and extending from the trapping relief towards the inlet side of the pump. This additional groove communicates pressurized fluid from the pump outlet to the tooth spaces towards the inlet side of the pump, thereby to improve the operation of the pump.

It is an object of the present invention, therefore, to provide an improved pressure-loaded movable bushing for a pressure-loaded gear pump.

Another object of the present invention is to provide an improved cooling and lubricating arrangement for a pressure-loaded movable bushing in a pressure-loaded gear pump which will insure flooding of the bearing and journalling surfaces of the bushing with an adequate supply of pressurized coolant and lubricant.

Another object of the present invention is to provide a pressure-loaded movable bushing having chamfered areas on either or both the inlet and outlet sides of the pump to alleviate against erosion conditions.

Yet another object of the present invention is to provide improved means for preventing shifting of two adjoining pressure-loaded movable bushing elements.

A further object of the present invention is to provide improved trapping relief means for the end plate means of a pressure-loaded gear pump as well as means for communicating fluid at outlet pressure towards the inlet side of the pump and in communication with the tooth spaces of the gears.

Many other features, advantages and additional objects of the present invention will become manifest to those versed in the art upon making reference to the detailed description which follows and the accompanying sheets of drawings in which a preferred structural embodiment of a pressure-loaded gear pump incorporating the principles of the present invention is shown by way of illustrative example.

Figure 1:
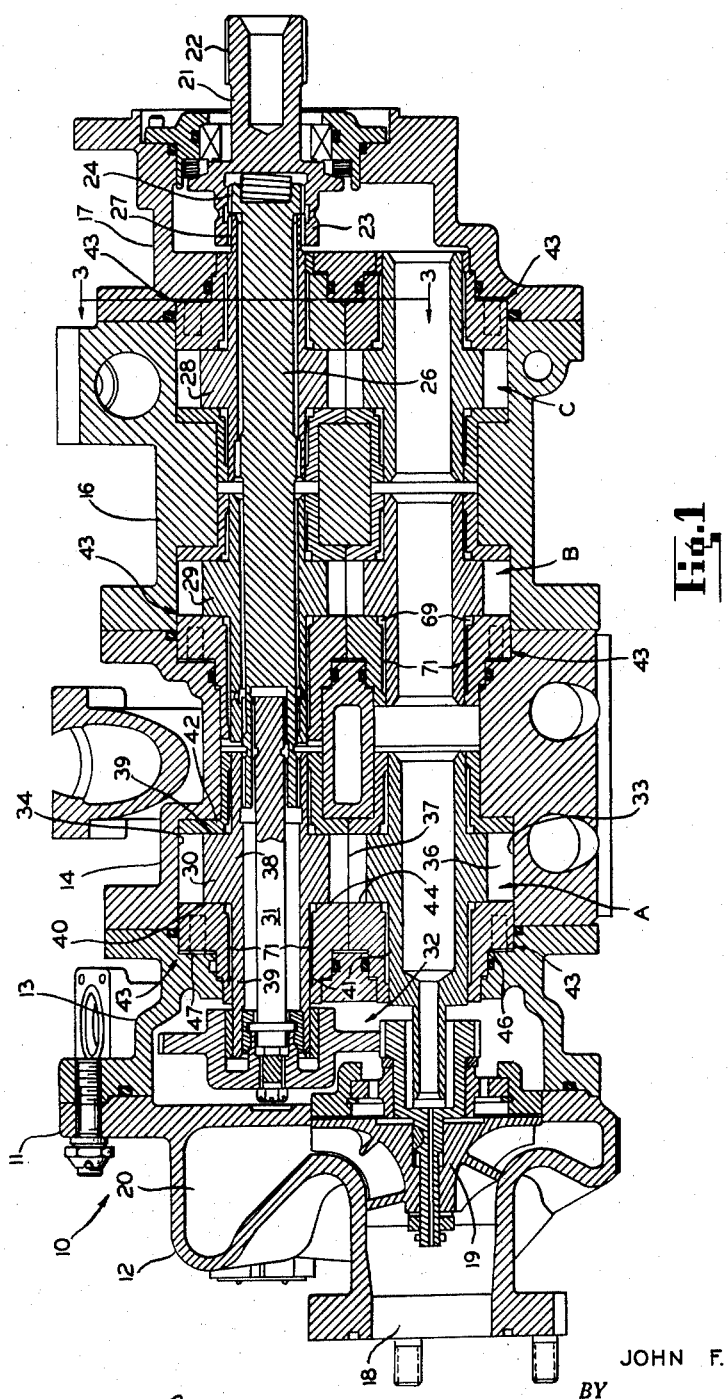
Figure 1 is a cross-sectional view showing a multiple pump including pressure-loaded gear pump components constructed in accordance with the principles of the present invention and taken substantially on the plane of line I—I of Figure 2.
Figure 2:
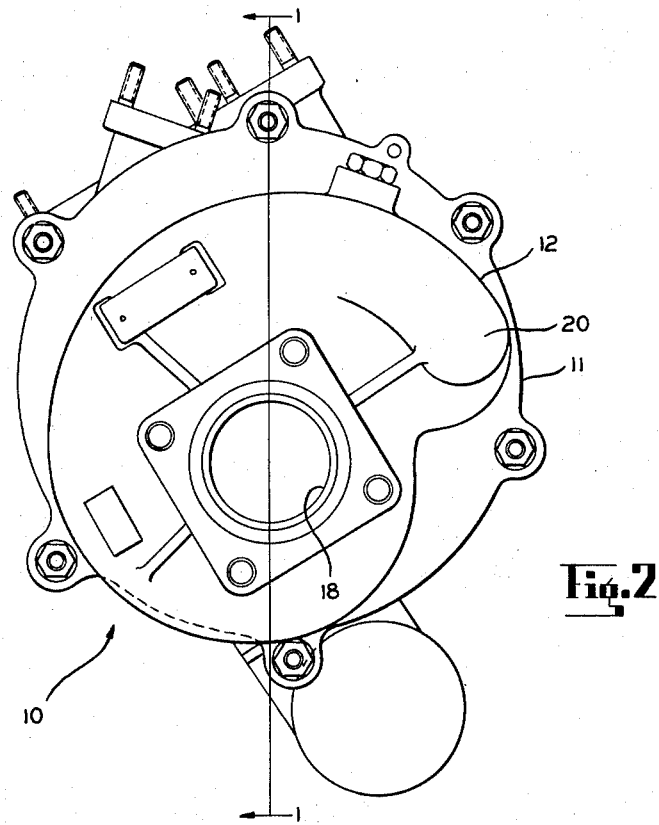
Figure 2 is an end elevational view of the pump shown in Figure 1.

The principles of the present invention are of general applicability to pumping mechanisms, however, in the illustrative embodiment herein described by way of one exemplary structure incorporating the principles of the present invention, a multiple pump is shown indicated at 10 which comprises a housing 11 formed by a plurality of fastened together sections identified from left to right on Figure 1 by the numbers 12, 13, 14, 16 and 17.

The housing part 12 has an inlet 18 formed therein leading to the eye of a centrifugal impeller 19 and discharging fluid through a volute chamber 20 for supplying fluid at a positive inlet pressure to three gear pump units indicated at A, B and C.

The four separate sets of rotary fluid displacement means provided by the gear units A, B and C and the centrifugal impeller 19 are driven by a common driving member 21 splined as at 22 for connection to a suitable power take-off and having a collar portion 23 internally splined as at 24 to a shaft member 26 and splined as at 27 to the driver gear 28 of the gear unit C.

The shaft member 26 extends through the driver gear 28 as well as through a driver gear 29 of the gear unit B, there being provided appropriate connections to effect rotation of the driver gear 29 and a driver gear 30 provided for the gear unit A.

Additionally, there is provided a second shaft member 31 which is connected to the shaft member 26 and in turn coupled by means of a speed proportioning means identified generally by the reference numeral 32 to the centrifugal impeller 19 so that the centrifugal impeller 19 will be rotated at a proportionally higher speed than the driver and driven gears of the gear units A, B and C.

For purposes of the present disclosure, each of the gear units A, B and C are essentially identical, and accordingly, further description of the detailed components of each of the gear units A, B and C will utilized common reference numerals wherever possible.

Each of the respective housing parts is so formed and shaped to provide a pair of intersecting bores 33 and 34 which together form a pumping cavity in which the intermeshing driver and driven gears are rotated for functioning as a rotary fluid displacement means, thereby moving fluid from an inlet on one side of the pumping cavity to an outlet on the other side of the pumping cavity.

In accordance with conventional gear pump practice, it will be appreciated that the driver and driven gears have a plurality of circumferentially spaced teeth 36 thereby circumferentially alternating teeth and tooth spaces, the tooth spaces being filled with fluid at the inlet side of the pump and carrying the fluid around the outside of the pumping cavity towards the outlet side of the pump whereupon the fluid will be forced out of the tooth spaces by the meshing of the gears at the point of intermesh indicated generally at 37.

Each gear unit provided in accordance with the principles of the present invention has a hub portion indicated by the reference numeral 38 and a shaft portion indicated at 39. The hub 38 not only provides the gear teeth 36 but has at opposite sides thereof gear side faces identified at 39 and 40, respectively. The shaft portions 39 of each respective gear 30 extend on the axis of rotation of the gear 30 outwardly from the gear side faces 39 and 40. The outer peripheral surface of the shaft portions 39 constitute a bearing and journalling surface indicated at 41.

Each of the side faces 39 on the respective gear members abuts and engages the adjoining sealing face of a stationary bushing indicated at 42.

On the other side of each respective gear, the pumping cavity is closed by a pressure-loaded movable bushing indicated generally at 43.

Each of the pressure-loaded movable bushings 43 is essentially a backing plate for the pumping cavity and has a front sealing surface 44 for engaging and sealing against the adjoining side face 40 of each respective gear and a rear pressure-receiving back face 46 which, together with means including the housing 11 forms a pressure control chamber indicated at 47. The pressure control chamber 47 is placed in pressure communication with the gear pump outlet, whereupon the pressure-receiving back face 46 will be loaded to provide a continuous biasing force urging the movable bushing axially into sealing engagement with the adjoining side face 40 of the gear 30.

Referring more particularly now to Figures 3–7, inclusive, the improved structural characteristics of the pressure-loaded movable bushings 43 will be described in detail.

Figure 3:
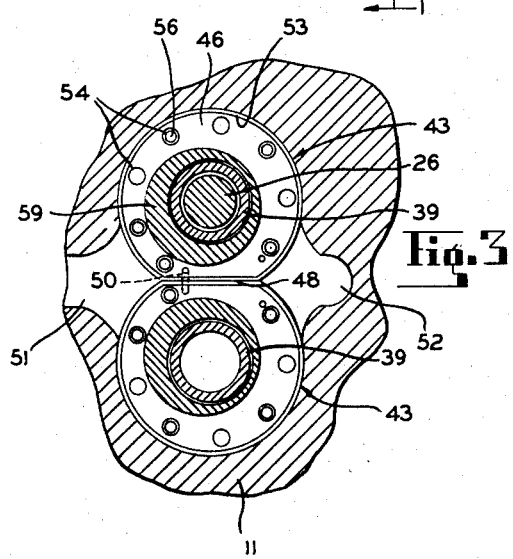
Figure 3 is a fragmentary cross-sectional view taken substantially on line III—III of Figure 1 and showing additional details of construction of the pressure-loaded movable bushings provided in accordance with the principles of the present invention.

Referring first of all to Figure 3, it will be noted that each bushing 43 is substantially circular in overall configuration, thereby conforming in shape to the intersecting bores 33 and 34 forming the pumping cavity. Each bushing is particularly characterized, however, by the provision of a flattened portion cut off along a chordal section thereby providing a pair of abutment surfaces indicated on Figure 3 by the reference numeral 48.

Each of the abutment surfaces 48 on each respective bushing 43 is particularly characterized by the formation therein towards the inlet side of the bushing of a recess 49. Thus, when a pair of bushings 43 are placed in adjoining relationship in a pump structure, a corresponding pair of recesses 49 will lie in register with one another. A pin 50 is located in the recesses 49 and locks the adjoining pair of bushings 43 against shifting, thereby preventing cocking of the movable bushings 43.

In Figure 3, a typical gear pump unit arrangement is indicated and there is shown an inlet portion 51 and an outlet portion 52 on opposite sides of a pumping cavity 53.

The back face or pressure-receiving surface 46 of the bushings 43 is indicated as being provided with a plurality of recesses 54. Each of these recesses 54 seats a small continuous biasing means such as a coil spring 56. One end of each coil spring 56 is bottomed against the bushing 43 and the opposite end is bottomed against a corresponding adjoining wall of the pump housing 11, thereby providing an initial biasing force to urge the bushings 43 into sealing engagement with the gears.

As will be noted upon referring to the drawings, each bushing 43 has a backing plate portion 57 and a tubular extension 58. The backing plate portion 57 can also be considered in the nature of a flange on the end of the tubular portion 58. In any event, the axis of the tubular portion 58 coincides with the axis of the flange 57 so that all recesses formed in the pump housing 11 can be held concentric with respect to the common axis.

There is provided directly adjacent the pressure-receiving back surface 46 and extending radially outwardly from the tubular portion 58 an annular shoulder 59 which is eccentrically displaced towards the inlet side of the pump relative to the axis of the tubular portion 58. As is clearly shown in Figure 3, the eccentric displacement of the shoulder 59 has the effect of substantially reducing the total effective area of the pressure-receiving back surface 46. Thus, unequal pressure forces developed in the pumping cavity 53 will be resisted by similarly offset forces produced on the pressure-receiving back face 46 because the centroid of pressure will be shifted thereby to promote a balanced loading of the bushings 43.

Figure 4:
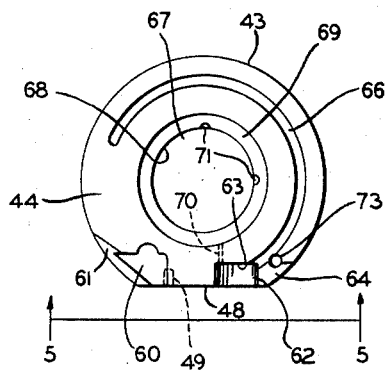
Figure 4 is an elevational view of a pressure-loaded movable bushing provided in accordance with the principles of the present invention and showing details of construction of the front sealing face of the bushing, the plane of Figure 4 being taken on the line IV—IV of Figure 5.
Figure 6:
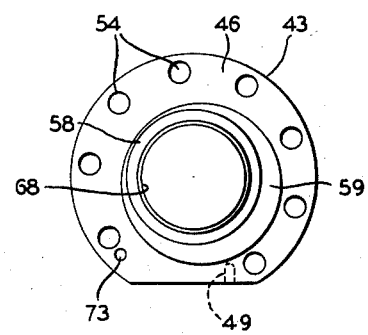
Figure 6 is an elevational view of the bushing of Figures 4 and 5 and taken substantially on the plane of line VI—VI of Figure 5.

In Figure 4, a bushing is shown in such orientation that the left-hand side of Figure 4 corresponds to the inlet side of the pump and the right-hand side corresponds to the outlet side of the pump.

In order to alleviate against an erosion condition resulting from cavitation effects and other eroding phenomena occurring within the pump, a chamfered area forming a first recess means 60 is formed on the surface 44 on the inlet side of the pump. The chamfered area 60 extends generally tangentially as is indicated at 61 and is located at the periphery of the surface 44, extending radially inwardly a sufficient distance so that the relief area lies adjacent the tooth spaces of the adjoining gear.

Figure 5:
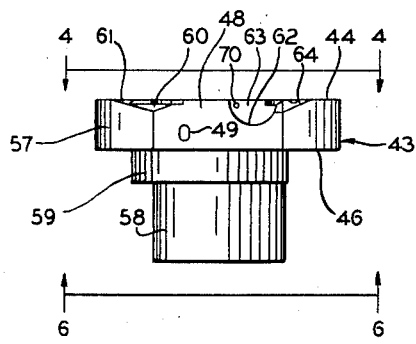
Figure 5 is an elevational view of the bushing shown in Figure 4 and taken on the plane of line V—V of Figure 4.
Figure 7:
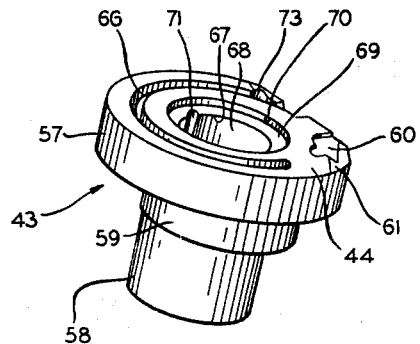
Figure 7 is a perspective view of the bushing provided in accordance with the principles of the present invention illustrating additional details of construction thereof.

On the outlet side of the bushing 43 and also formed in the surface 44 is a trapping relief recess 62. The trapping relief recess 62 is of a curved configuration and as is indicated in Figure 5 has an axial extent of sufficient depth to provide a recess having an end wall 63. Extending generally tangentially with respect to the periphery of the bushing 43 and outwardly away from the trapping relief recess 62 is an additional chamfered area indicated at 64 forming a second recess means for alleviating against erosion conditions in the area of the pump outlet.

The surface 44 is further characterized by the provision of an annular extending groove 66 communicating at one end with a trapping relief recess 62 and extending outwardly of the root diameter of the adjoining gear teeth but inwardly of the outer periphery of the bushing towards the inlet side of the bushing, thereby to communicate discharge pressure from the pump outlet to the tooth spaces of the gears. This provision balances the pressure forces acting on the bushing 43 and improves the operation of the pump.

The surface 44 is additionally characterized by the provision of a centrally disposed bore 67 extending inwardly through the surface 44 and providing bore walls 68 forming a bearing and journalling surface for sustaining the shaft portions 39 of the gears.

In this particular embodiment, the bore 67 extends completely through the bushing 43. It may be further noted that the axis of the bore 67 is concentric to the axis of the end plate portion 57 of the bushing 43 so that all bore dimensions in the pump housing 11 can be held in concentricity.

At the radial innermost portion of the surface 44, there is provided a counterbore or recess indicated at 69. This recess 69 lies directly adjacent the point of juncture of the shaft portion 39 and the hub portion 38 of the gears and thereby affords a clearance which tends to avoid binding and seizure between the bushing 43 and the corresponding gear. Additionally, the recess or counterbore 69 forms a reservoir for receiving a supply of fluid at increased pressure and operative as a lubricant and coolant for the bearing and journalling surfaces.

To assist in accomplishing this objective, there is provided between the trapping relief 62 and the counterbore or recess 69 a separate pasageway 70 establishing flow communication between the pump outlet and the recess 69.

The bore walls 68 are also characterized by the provision of one or more grooves 71 communicating at one end with the recess 69, thereby to assist in flooding the bearing and journalling surfaces with an adequate supply of coolant and lubricant. As shown in Figure 1, the grooves 71 are blind-ended to assist in retaining an adequate supply of coolant and lubricant on the surface per se.

Since the movable bushing 43 is pressure-loaded into sealing contact with the adjoining side face of a gear by pump generated pressure, the bushing 43 is further characterized by the provision of an axially extending passage 73 formed between the front and rear faces 44 and 46 and establishing flow communication between the pump outlet and the pressure control chamber 47. Referring specifically to Figure 4 and also Figure 7, note that the passage 73 intersects not only the recess 64 but also the groove 66 and is located in such a manner that full discharge pressure will be communicated to the pressure-receiving back surface 46 forming one wall of the pressure control chamber 47.

Although various minor structural modifications might be suggested by those versed in the art, it should be understood that I wish to embody within the scope of the patent warranted hereon all such modifications as reasonably and properly come within the scope of my contribution to the art.

I claim as my invention:

1. In a high pressure pump including a body having a pumping cavity with an inlet and an outlet, a bearing means for said cavity having an end plate portion providing a sealing face for the pumping cavity and a tubular bearing portion, said bearing means arranged to form together with said body a chamber behind said end plate portion, means providing a passage in communication with the pump discharge and said chamber, whereby pressure loads are provided on both sides of said end plate portion, an annular recess formed in the sealing face of said end plate portion adjoining the pumping cavity, a trapping relief recess in said sealing face on the discharge side of said pump and extending longitudinally inwardly of said face, and a radially extending cylindrical passage formed in said end plate portion longitudinally inwardly of said sealing face extending between said annular recess and said trapping relief recess communicating pump discharge from said trapping relief recess to said annular recess for flooding the bearing means with coolant and lubricant at pump-generated pressure.

2. In a high pressure pump including a body having a pumping cavity with an inlet and an outlet, a bushing for said cavity having an end plate portion providing a sealing face for the pumping cavity and a tubular bearing portion, said bushing arranged to form together with said body a chamber behind said end plate portion, means forming a passage extending axially through said end plate portion in communication with the pump discharge and said chamber, whereby pressure loads are provided on both sides of the end plate portion, one of said sides of said end plate portion constituting a motive surface and said motive surface having a plurality of circumferentially spaced recesses formed therein, a coil spring bottomed in each said recess and having its opposite end engaging against said body to preload said bushing towards the pumping cavity, an annular recess formed in the sealing face of said end plate portion adjoining the pumping cavity, a trapping relief recess in said sealing face on the discharge side of said pump and extending longitudinally inwardly of said sealing face, and a radially extending cylindrical passage formed in said end plate portion longitudinally inwardly of said sealing face extending between said annular recess and said trapping relief recess communicating pump discharge to said annular recess from said trapping relief recess for flooding the bearing portion with coolant and lubricant at pump-generated pressure.

References Cited in the file of this patent

UNITED STATES PATENTS

| | | |
|---|---|---|
| 1,682,842 | Hamer | Sept. 4, 1928 |
| 1,863,160 | Jensen | June 14, 1932 |
| 1,972,271 | McIntyre | Sept. 4, 1934 |
| 2,212,994 | Vrolix | Aug. 27, 1940 |
| 2,233,709 | Osborne | Mar. 4, 1941 |
| 2,310,078 | Herman | Feb. 2, 1943 |
| 2,321,609 | Marco | June 15, 1943 |

(Other references on following page)

UNITED STATES PATENTS

| | | |
|---|---|---|
| 2,424,751 | Heckert | July 29, 1947 |
| 2,487,732 | Schanzlin | Nov. 8, 1949 |
| 2,527,941 | Lauck et al. | Oct. 31, 1950 |
| 2,624,287 | Ilyin | Jan. 6, 1953 |
| 2,676,548 | Lauck | Apr. 27, 1954 |
| 2,682,836 | Orr | July 6, 1954 |
| 2,706,452 | Hilton | Apr. 19, 1955 |
| 2,714,857 | Albright et al. | Aug. 9, 1955 |
| 2,718,758 | Minshall et al. | Sept. 27, 1955 |
| 2,781,730 | Newmier | Feb. 19, 1957 |